Patented Nov. 13, 1923.

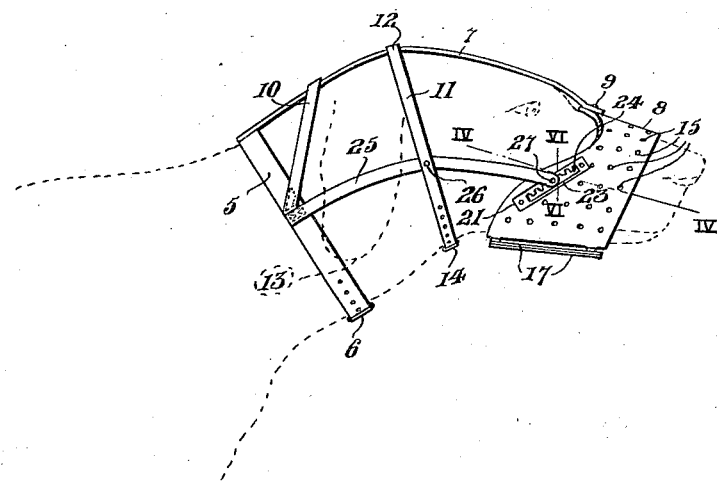

1,474,303

UNITED STATES PATENT OFFICE.

JOE VERES, OF LLOYDELL, PENNSYLVANIA.

DOG MUZZLE.

Application filed April 18, 1923. Serial No. 632,940.

*To all whom it may concern:*

Be it known that I, JOE VERES, a citizen of the United States of America, residing at Lloydell, in the county of Cambria and State of Pennsylvania, have invented certain new and useful Improvements in Dog Muzzles, of which the following is a specification.

This invention relates to new and useful improvements in muzzles for dogs or other animals.

An important object of the invention is to provide a muzzle of strong and durable construction and one that is capable of being adjusted to accommodate animals having heads of different size.

A further object of the invention is to provide a muzzle of the above mentioned type wherein the mouth encircling portion may be adjusted longitudinally of the animal's snout and wherein a limited amount of freedom of movement is allowed the animal's jaws.

Other objects and advantages of the invention will be apparent during the course of the following description.

In the accompanying drawing forming a part of this specification and in which like numerals are employed to designate like parts throughout the same, Figure 1 is a side elevational view of the muzzle embodying this invention properly positioned upon the head of a dog shown in dotted lines, Figure 2 is a fragmentary front elevational view of the mouth encircling portion of the muzzle, Figure 3 is a detail side elevational view of the mouth encircling portion shown in Fig. 2, Figure 4 is a longitudinal sectional view taken on line IV—IV of Fig. 1, Figure 5 is a fragmentary sectional view showing the connection of a toggle member with the mouth encircling portion of the muzzle, Figure 6 is a detail sectional view taken on line VI—VI of Fig. 1, and Figure 7 is a detail view of a plate member adapted for being secured to the mouth encircling portion of the muzzle and provides suitable means for adjusting the same in relation to the animal's mouth.

In the drawing, wherein for the purpose of illustration is shown a preferred embodiment of this invention, the numeral 5 designates a neck encircling strap that is provided with a buckle member 6 for the purpose of properly adjusting the length of the strap to accommodate the animal's neck, as shown in dotted lines. Suitably secured to the strap 5 at a point substantially midway of its length is a strap 7 that is adapted for extending longitudinally of the animal's head and is to be positioned on top of the same, the outer end of the strap 7 being secured to the mouth encircling portion 8 in any suitable manner, such as by a rivet 9. Suitably secured at its opposite ends to the strap 5 is a substantially arcuately arranged strap 10 that is suitably secured substantially midway of its length to the strap 7 at a point spaced from the latter's connection with the strap 5, there being provided a strap 11 that is secured to the strap 7, as at 12, and is adapted for encircling the animal's head at a point forwardly of the ear 13 shown in dotted line, the said strap 11 being provided with a buckle connection 14 for its ends thereby allowing the same to be properly adjusted to accommodate the animal's head.

The mouth encircling portion 8 is of considerably greater width than any of the straps heretofore described and is provided with a series of apertures 15 adapted for furnishing proper ventilation for the mouth of the animal therewithin. Pivotally secured to the outer spaced ends of the portion 8, as by rivets 16, are a pair of crossed toggle members 17 that are suitably connected, as at 18 and are provided at their opposite ends with longitudinally extending slots 19 which are adapted for slidably engaging the rivets 20 carried by the said mouth encircling portion 8.

Referring particularly to Figs. 1, 3, 6 and 7 there is shown a diagonally arranged recess 21 formed in both sides of the mouth encircling portion 8 and is adapted for receiving a plate member 22 properly secured therewithin that is provided with a pocket 23 having a scalloped border portion 24 as shown. Secured to the neck encircling strap 5 are straps 25 that extend longitudinally of the animal's head and are positioned on opposite sides of the same, there being provided rivet connections 26 with the head encircling strap 11 while the outer free ends of the said straps 25 are provided with rivets 27 having enlarged heads 28 for the purpose of adjustably engaging the scalloped edge portion 24 of the pocket 23 formed in the plate member 22, thereby providing adjusting means for longitudinally varying the position of the mouth encircling portion 8 with respect to the animal's mouth.

It will be seen from the accompanying drawing and the above detail description that the neck encircling strap 5 and head encircling strap 11 may be suitably adjusted for accommodating animals' heads of different size and that the toggle connection 17 between the ends of the mouth encircling portion 8 will allow a limited amount of freedom of the animal's jaws. The adjustable connection between the side straps 25 and the mouth encircling portion 8 provides means whereby the muzzle may be properly fitted to animals having different length muzzles or snouts. In adjusting the muzzle to an animal's head, the mouth encircling portion 8 is drawn over the snout and the straps 5 and 11 are adjusted to fit the neck and head portions, the mouth encircling portion 8 is then moved rearwardly upon the snout until the inner edges of the same engage the enlarged jaw portions of the head, the rivets 27 are then shifted along the scalloped edges 24 until the straps 25 are tight. The drawing of the straps 25 taut by adjusting the positions of the rivets 27 will prevent the mouth encircling portion 8 from shifting forwardly upon the animal's snout and will also prevent the rivets from becoming disengaged from the scalloped edges 24.

It is to be understood that the form of this invention herewith shown and described is to be taken as the preferred example of the same, and that various changes in the shape, size, and arrangement of parts may be resorted to without departing from the spirit of the invention or the scope of the subjoined claim.

Having thus described the invention, I claim:—

In a muzzle of the type described, a mouth encircling portion having ventilating openings formed therein, crossed toggle members pivotally connected at their inner ends to the free ends of said mouth encircling portion, said toggle members having slots at their outer ends adapted for slidably engaging rivets carried by said mouth encircling portion, a neck encircling strap, a head encircling strap, and means for connecting said neck and head straps and said mouth encircling portion.

In testimony whereof I affix my signature.

JOE VERES.